United States Patent [19]

Facer

[11] Patent Number: 4,579,188
[45] Date of Patent: Apr. 1, 1986

[54] MULTI-SPEED TRANSMISSION FOR FRICTION DRIVEN CYCLES

[76] Inventor: Robert H. Facer, 42110 Bodie Rd., Palm Desert, Calif. 92260

[21] Appl. No.: 669,880

[22] Filed: Nov. 9, 1984

[51] Int. Cl.[4] .................. B62D 61/02; B62D 61/08; B60K 1/00; B60K 17/14
[52] U.S. Cl. .................................. 180/211; 180/221; 180/222
[58] Field of Search ............... 180/211, 210, 212, 217, 180/222, 221, 220, 65.7, 65.6

[56] References Cited

U.S. PATENT DOCUMENTS 2,451,965 10/1948 Longenecker ...................... 180/221
2,794,510 6/1957 Mennesson .......................... 180/222
4,175,629 11/1979 Kalajzich ............................. 180/222

*Primary Examiner*—Richard A. Bertsch
*Attorney, Agent, or Firm*—Bruce A. Jagger; Natan Epstein

[57] ABSTRACT

A multi-speed friction drive suitable for propelling cycle vehicles comprises a drive frame attachable to the frame of the cycle, a drive motor mounted to the frame, a gear hub mounted to the drive frame and driven by the motor through a belt drive. A friction roller is formed on the outer shell of the gear hub, which is coupled to the belt drive through a shiftable gear arrangement internal to the gear hub. The cycle is propelled by frictional engagement of the roller with a cycle wheel.

14 Claims, 3 Drawing Figures

U.S. Patent  Apr. 1, 1986  4,579,188
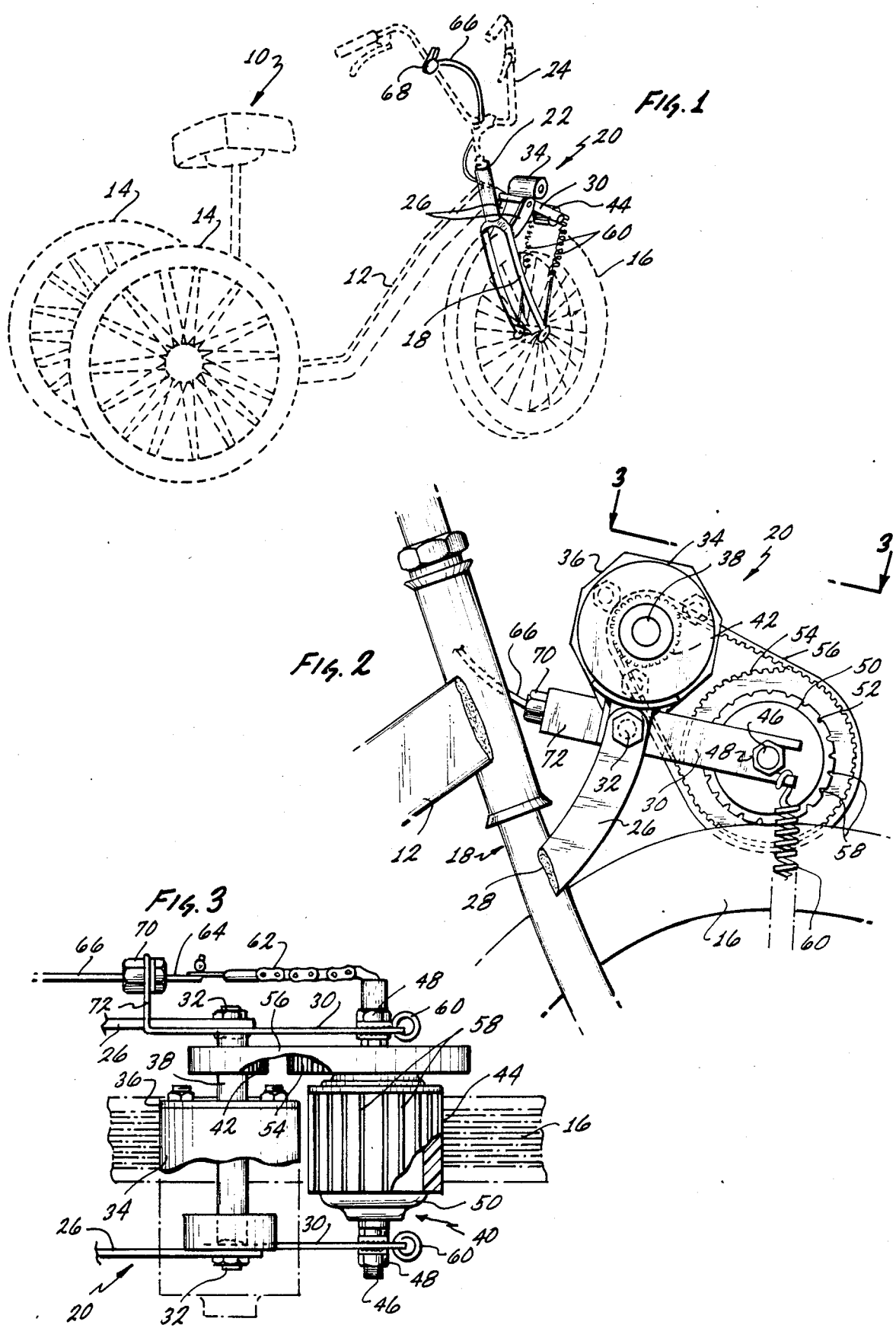

MULTI-SPEED TRANSMISSION FOR FRICTION DRIVEN CYCLES

BACKGROUND OF THE INVENTION

1. Field of the Invention

The present invention relates generally to a drive unit for propelling a wheeled vehicle by frictional engagement of a power driven friction roller with one of the wheels of the vehicle, and more particularly relates to an improved drive unit provided with a multi-ratio speed transmission.

1. State of the Prior Art

Various systems and drive units of the friction type are known for use with wheeled vehicles, particularly with cycles.

Typically, the known drive units are auxiliary power drives or assists which comprise a drive motor and a friction roller coupled to the motor and supported in frictional engagement with the front or steerable wheel of the cycle. Rotation of the friction roller is transmitted by friction to the driven cycle wheel.

Exemplary of such known devices are the drives disclosed by Palmer in U.S. Pat. No. 4,113,043, Bialek in U.S. Pat. No. 3,841,428, Pennebaker, et al., in U.S. Pat. No. 4,221,275, and Kalajzich in U.S. Pat. No. 4,175,629.

All of these drives are characterized by the use of a battery powered electrical drive motor which has an output shaft which is either directly coupled to the friction roller, or is coupled to the friction roller by means of a belt drive as in Pennebaker, et al.

None of the friction drives of the type exemplified in the referenced patents or otherwise known to the applicant provide means for varying the speed ratio between the friction roller and the drive motor output shaft in a ready manner by an operator of the vehicle for optimum transmission of power to the friction roller under varying road and/or vehicle load conditions.

For example, it is desirable to provide a low gear ratio between the drive motor output shaft and the friction roller during starting of the vehicle, and during uphill climbing, in order to most effectively utilize the torque output of the motor and make best use of the limited battery power available. Such a low gear ratio, however, is not optimum for cruising on level stretches, and for this purpose a higher gear ratio is desirable. For intermediate conditions, at least one intermediate gear ratio is indicated.

Such a variable gear ratio device should be light weight, so as not to materially increase the load to be propelled, given the limited charge available from the batteries, should be economical since this type of drive is intended for low cost vehicles and it would defeat its purpose to substantially increase the cost of the drive, and, finally, should be simple to operate and reliable in its functioning since such power assist drives are frequently employed by the elderly or the handicapped.

A continuing need exists for a friction drive for cycle vehicles which meets the aforementioned criteria.

SUMMARY OF THE INVENTION

The present invention overcomes these and other shortcomings of the prior art, and provides a reliable, simple to operate, low cost and lightweight multi-speed friction drive provided with a proportional speed control useful for cycle vehicles, including bicycles and tricycles.

The multi-speed cycle drive of the present invention comprises a frame attachable to the frame of the cycle to be driven, and a drive motor mounted to the drive frame. The proportional speed control includes a multi-speed gear hub which includes a hub axle mounted to the drive frame, a gear drive input, a gear output, a hub shell driven by the gear output, and a gear shift for varying the ratio between the gear drive input and the gear output. The output shaft of the drive motor is coupled to the gear drive input by suitable means such as a cog belt drive. The hub shell of the gear hub may itself be used as the friction roller by applying a suitable high friction layer to the shell surface or otherwise treating the shell so as to provide for high friction engagement with the cycle wheel to be driven. This treatment may consist of molding a cylindrical layer of synthetic resin onto the hub shell.

Gear hubs of the type contemplated herein are commercially readily available from bicycle parts' suppliers, and have in the past been used in bicycles for coupling the pedal driven chain drive to the rear wheel. In such conventional use, the rear bicycle wheel is mounted to the hub shell of the gear hub while the bicycle chain is engaged to a sprocket provided on the gear hub and mounted to the gear drive input. The commercially available gear hub unit is adapted for incorporation into a novel multi-speed friction drive unit in a manner which is explained below.

Multi-speed drive of this invention can be powered either by electrical, battery powered motors, or by means of internal combustion engines such as a small gasoline engine. In the case of gas engines provided with a clutch, the provision of a multi-speed drive such as disclosed herein reduces wear and tear on the engine when starting since it is possible to engage the clutch at a lower gear ratio to make maximum use of the available torque output of the engine. In some cases, electrically driven friction drives of this type are also provided with means for decoupling the friction roller from the driven cycle wheel. The motor may be started while the friction drive is disengaged, and the drive is then frictionally engaged to the cycle wheel. In applying the rotating friction roller to the stationary cycle wheel, a considerable amount of wear and abrasion of both the friction roller and the rubber tire of the cycle wheel takes place. This wear and tear is considerably reduced by use of a multi-speed drive such as disclosed herein, which allows the friction roller to be applied to the stationary wheel at an initial relatively low speed. Thus, the use of the novel multi-speed friction drive lengthens the useful life expectancy of the drive and the vehicle, lowers the required maintenance, and increases economy of operation by reducing the amount of power, either electrical or gasoline, required by the drive under varying conditions.

The lightweight compact multi-speed drive of this invention is particularly advantageous for use in folding bicycles and tricycles since minimum weight is of the essence in such applications given that the folded vehicle is often loaded and unloaded manually onto another vehicle, or may be carried to and from storage locations, etc. It is thus important to not substantially increase the weight or bulk of such folding devices, which object is achieved by the present invention.

BRIEF DESCRIPTION OF THE DRAWINGS

FIG. 1 illustrates in phantom lining a typical tricycle on which has been installed a multi-speed motorized friction drive unit according to this invention shown in solid lining.

FIG. 2 is a side elevational view of the novel variable speed drive attached to the front wheel fork of a cycle.

FIG. 3 is a top view partly broken away of the friction drive of FIG. 2 taken along line 3—3.

DETAILED DESCRIPTION OF THE PREFERRED EMBODIMENTS

With reference to the drawings and FIG. 1 in particular, a tricycle 10 includes a cycle frame 12 mounted for rolling on a pair of rear wheels 14 and a front wheel 16. The front wheel is steerable by means of a fork 18 which is pivotably mounted to the cycle frame 12 at 22, and is controllable by a rider by means of handle bars 24 in a manner well known in the art.

A friction drive unit 20 constructed according to the present invention is mounted to fork 18 by supporting brackets 26, which are welded to the fork at 28, one bracket to each tyne of the fork 18. The drive 20 further comprises a drive frame 30 which is pivotably supported between the parallel brackets 26, as best appreciated in FIG. 3.

An electrically powered drive motor 34 is mounted to a mounting plate 36 of the drive frame 30, and has an output shaft 38 to which is mounted a first cog wheel 42. The drive motor 34 is connected by suitable conductors to one or more batteries (not shown) mounted on the cycle frame in a manner which is conventional with friction drive assisted cycles.

The friction drive unit further comprises a gear hub 40 on which is formed a friction roller 44. The gear hub is of conventional construction, and its internal workings need not be detailed here. Gear hubs suitable for use in the friction drive of this invention may be readily obtained in the commercial marketplace, and their internal construction and operation need not be detailed in the specification. In a presently preferred embodiment of the invention, a three-speed gear hub manufactured by the well-known Shimano Company of Japan, and marketed in the United States through the Shimano Sales Corporation, 9259 San Fernando Road, Sun Valley, Calif. 91352, telephone (213) 767-7777, was selected. The preferred gear hub is sold as model SG-3S23, and comes with a bell crank actuator which mounts to the end of the hub axle, and is provided with an actuating rod which effects the gear shift action within the hub, under control of a gear shift lever remotely mounted, e.g., to the handle bar of the cycle and connected to the bell crank by means of a Bowden control cable.

In general, gear hubs of the type used in the novel drive of this invention include a hub axle 46 mounted to the frame 30 by suitable nuts and washers, a gear drive input and output gear means which are contained within a generally cylindrical hub shell 50 and are not externally visible. The hub shell 50 is driven by the output gear means while the input gear means of the aforementioned Shimano gear hub has attached thereto a sprocket 52, best seen in FIG. 2. In conventional use, the sprocket 52 is driven by a bicycle chain in response to pedaling action of a rider, while the rear bicycle wheel is mounted to the hub shell 50. The internal gearing of the hub is such that the ratio of the hub speed to the sprocket speed can be varied by actuation of the bell crank or other gear shift means provided in the particular gear hub unit.

The friction drive of this invention makes novel use of such commercially available gear hubs by incorporating the gear hub into a friction roller 44 and coupling the gear drive input of the hub to a drive motor 34, to obtain a compact, lightweight and reliable multi-speed friction drive. The coupling between the drive motor 34 and gear hub input sprocket 52 includes a second cog wheel 54 which is secured concentrically to the sprocket 52 as by riveting thereto, and a cog belt 56 drivingly connecting the first and second cog wheels 42, 54, respectively.

The friction roller 44 may be formed on the hub shell 50 by molding a layer of synthetic resin directly onto the hub shell exterior surface, such that the roller is fixed coaxially to the hub shell. To increase traction of the roller 44 against the driven wheel 16, axially extending grooves 58 may be cut in the cylindrical surface of the friction roller.

The friction roller 44 is urged into frictional driving engagement with the driven wheel 16 by means of a pair of coil springs 60 connected at one of their ends to the frame 30 of the friction drive unit at a point near the gear hub axle 46, and attached at their opposite end to the axle of the driven wheel 16, or to a point on the fork 18, such that the stretched springs operate to pivot the frame 30 about the pivot axis 32, and thereby urge the friction roller 44 against the wheel 16.

The gear hub 40 shown in the drawings is not operated by a bell crank, but is instead actuated by a pull chain 62 emerging axially from the gear hub and connected at its free end to an actuating cable 64 which extends through a cable sleeve 66 towards the gear shift lever 68 mounted on the handle bar 24. The lower end of the sleeve 66 is fastened to a cable guide 70 mounted to the frame 30 by means of a bracket 72. The pull chain 62 is operated remotely by the gear shift lever 68 to shift the gear hub through its three possible speed ratios.

In a tricycle driven by a 1 horsepower motor through a multi-speed friction drive constructed according to this disclosure, speeds of 12–13 miles per hour were reached on a level stretch of road, and while climbing a 10% grade, it was possible to maintain a speed of approximately 4 miles per hour. Similar performance without a variable speed drive would require a 1.5 horsepower drive motor.

The proportional speed control of this invention may likewise be used with a two-wheel scooter, in which application speeds of up to 30 miles per hour can be reached.

The first cog wheel 42 is of smaller diameter than the second cog wheel 54, and the cog belt drive illustrated is therefore a reduction drive such that the sprocket 52 turns at a slower speed than the output shaft 38 of the motor. The ratio of the diameters of the two cog wheels may be varied to obtain different friction roller speeds as may be desirable given the characteristics of the particular motor 34.

The diameter of the friction roller 44 may also be adjusted relative to the diameter of the driven wheel 16 to likewise make optimum use of the torque output of the drive motor 34 and make efficient use of the electrical or other source of energy used for the friction drive.

It will be appreciated that different gear hub models and from yet other manufacturers and having a greater or lesser number of possible gear ratios than described herein may be adapted for use in the novel friction drive disclosed herein. Still other changes and modifications to the preferred embodiment illustrated herein will be apparent to those possessed of ordinary skill in the art. The scope of the invention is therefore limited only by the following claims.

What is claimed is:

1. A motor driven cycle comprising:
   a cycle frame mounted for rolling on at least two cycle wheels;
   a multi-speed gear hub including a hub axle mounted to said cycle frame, a gear input, output gear means, a hub shell driven by said output gear means, and gear shift means for varying the ratio between said gear input and said output gear means;
   a drive motor mounted to said cycle frame;
   means drivingly connecting said motor to said gear input;
   friction roller means coaxially mounted to said hub shell; and
   means for urging said friction roller means into frictional driving engagement with one of said cycle wheels.

2. The motor driven cycle of claim 1 further comprising a handle bar and wherein said means for varying the gear ratio comprise linkage means connected at one end to said gear hub and at the opposite end to a gear shift lever mounted on said handle bar or said cycle frame.

3. The motor driven cycle of claim 1 wherein said cycle is a tricycle with a front wheel mounted to a steerable fork, said gear hub and said motor being also mounted to said fork, said friction roller being engageable with said front wheel.

4. The motor driven cycle of claim 1 wherein said means for urging comprise spring means connected between said gear hub axle and the axle of said one cycle wheel.

5. The motor driven cycle of claim 1 wherein said friction roller means comprise a layer of material deposited on said hub shell to form a high friction drive surface.

6. The motor driven cycle of claim 5 wherein said deposited material is a synthetic resin.

7. The motor driven cycle of claim 6 wherein said high friction drive surface has axially oriented score lines for increased traction against said cycle wheel.

8. The motor driven cycle of claim 1 wherein said frame includes a pivot mount for pivotable attachment to a cycle frame and wherein said means for urging spring means attachable to a suitable point of a cycle for urging said friction roller means into driving frictional engagement with a cycle wheel.

9. The cycle drive of claim 1 wherein said means drivingly connected comprises a speed reduction belt drive connecting an output shaft on said motor to said gear drive input.

10. The cycle drive of claim 9 wherein said belt drive is a cog belt drive and includes a first cog wheel mounted to the output shaft of said motor and a second cog wheel affixed to said gear input means.

11. The cycle drive of claim 10 wherein said gear input means comprises a sprocket and said second cog wheel is mounted to said sprocket.

12. In a motor driven cycle comprising a cycle frame mounted for rolling on at least two cycle wheels, and a drive motor mounted to said cycle frame for driving a friction roller means engageable with one of said cycle wheels, the improvement comprising:
    a multi-speed gear hub including a hub axle mounted to said cycle frame, a gear input, output gear means, a hub shell driven by said output gear means, and gear shift means for varying the ratio between said gear drive and said output gear means;
    said friction roller means being driven by said hub shell; and
    means drivingly connecting said motor to said gear drive input.

13. The improvement of claim 12 wherein said means drivingly connecting comprise a reduction cog belt drive.

14. A motor driven tri-cycle comprising:
    a tri-cycle frame mounted for rolling on two rear wheels and a front wheel steerable by means of a fork provided with a handle bar;
    a motor drive frame pivotably mounted to said fork for movement in the plane of said front wheel;
    a multi-speed gear hub including a hub axle mounted to said motor drive frame, a gear drive input with a sprocket mounted thereto, output gear means, a hub shell driven by said output gear means, and gear shift means for varying the ratio between said gear drive and said output gear means;
    a drive motor mounted to said motor drive frame;
    a first cog wheel fixed to the output shaft of said drive motor, a second cog wheel mounted to said sprocket, cog belt means drivingly connecting said first and second cog wheels;
    friction roller means on said hub shell; and
    spring means connected between said drive frame and the lower end of said fork for urging said friction roller means into frictional driving engagement with said forward cycle wheel.

* * * * *